Oct. 13, 1953     R. L. JAESCHKE     2,655,612
ELECTRONIC CONTROL FOR INDUCTIVE APPARATUS
Filed Dec. 29, 1951     2 Sheets-Sheet 1

Ralph L. Jaeschke
Inventor.
Koenig and Pope
Attorneys.

Oct. 13, 1953  R. L. JAESCHKE  2,655,612
ELECTRONIC CONTROL FOR INDUCTIVE APPARATUS
Filed Dec. 29, 1951  2 Sheets-Sheet 2

Ralph L. Jaeschke,
Inventor.
Koenig and Pope,
Attorneys.

Patented Oct. 13, 1953

2,655,612

UNITED STATES PATENT OFFICE 2,655,612

ELECTRONIC CONTROL FOR INDUCTIVE APPARATUS

Ralph L. Jaeschke, Kenosha, Wis., assignor to Dynamatic Corporation, Kenosha, Wis., a corporation of Delaware Application December 29, 1951, Serial No. 264,201

11 Claims. (Cl. 310—93)

This invention relates to electronic controls for inductive apparatus, and more particularly, to an electronic control providing rapid controlled reduction of the field excitation of an electrical machine controlled by gaseous-discharge devices.

In the operation of an electrical machine having a variably excited field coil, it is sometimes desirable to decrease the field excitation quickly in order to obtain sharp response of the machine to control signals. The inductance of the field coil has the effect of sustaining current flow, and thereby tends to delay the response of the machine to control signals. The response time upon decrease of excitation may be substantially reduced, however, by quickly dissipating the inductive energy in the field coil. This invention pertains to an inverter circuit for accomplishing such a result. Under the process of inversion, the D. C. inductive energy of the field coil is converted to A. C. power which is returned to the power supply lines.

Briefly, the control of this invention comprises a power circuit including a pair of grid-controlled gaseous-discharge power tubes connected in parallel between an A. C. plate supply and a field coil so that each tube may conduct on alternative half cycles of the A. C. supply. Tube conduction is controlled by a plurality of grid circuits. A first grid circuit supplies a firing signal consisting of a sinusoidal A. C. rider on a variable D. C. bias and in fixed out-of-phase relation with the power supply. This grid circuit normally fires the power tubes and controls the excitation of the field coil during normal operation. Supplementing the first grid circuit is a second grid circuit providing a peaked periodic firing signal in relatively retarded fixed out-of-phase relation with the A. C. supply. This second firing signal causes the power tubes to invert the D. C. inductive energy of the field coil, and is supplied by a peaking transformer of the saturable core type connected through coupling capacitors to the control grids of the power tubes. The peaking transformers pass the peaked firing signals and block the sinusoidal firing signals. Rectifying valves and a small resistor are also connected in the inverter grid circuit. Other features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a diagrammatic representation of a dynamometer system which is an example of apparatus that may be controlled by the electronic control of this invention;

Similar reference characters indicate corresponding parts throughout the several views of the drawings.

Figure 1:
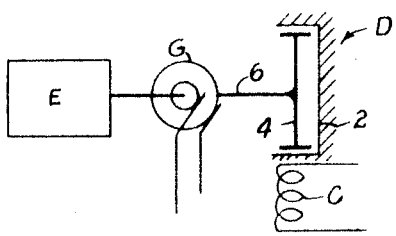

Fig. 1 diagrammatically illustrates a dynamometer system wherein a prime mover or engine E is mechanically loaded by an electric dynamometer D. The dynamometer has a relatively stationary (rocking) field member 2 carrying a field coil C, and a rotary inductor member 4 is mechanically coupled to the output shaft 6 of the engine E. The rotary slip between the members 2 and 4 and thereby the load on the engine is varied with the excitation of the field coil C. Speed changes are responded to or detected by a small tachometer type A. C. generator G, driven by the engine.

Figure 2:
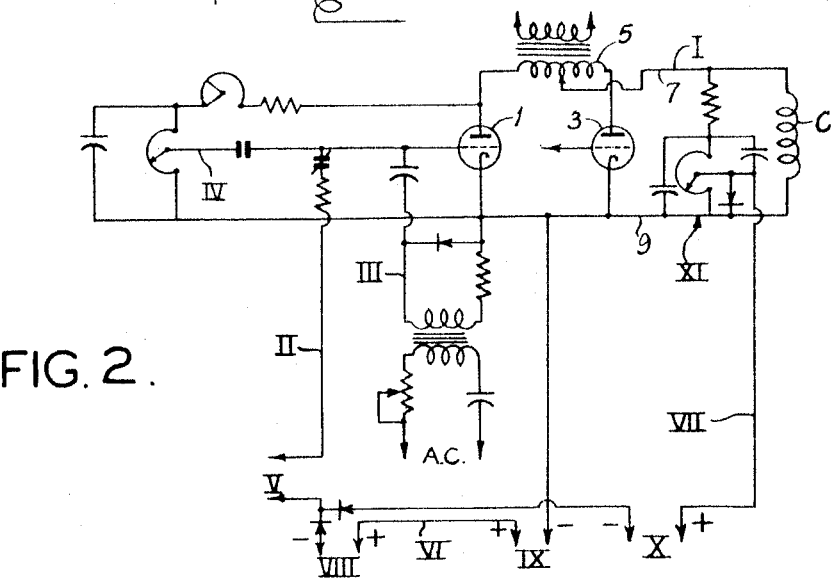
Fig. 2 is a simplified circuit diagram of the electronic control.

The simplified circuit diagram of Fig. 2 shows a power circuit I incorporating a pair of grid-controlled gaseous-discharge tubes I and 3. The tubes I and 3 are plate-connected to opposite ends of a center-tapped power transformer 5 supplied from a suitable A. C. power supply. A connection 7 is made from the center tap to one terminal of the field coil C and the other terminal of the field coil is connected at 9 to the cathodes of the tubes I and 3. This arrangement is known as a parallel rectifying system.

Figure 5:
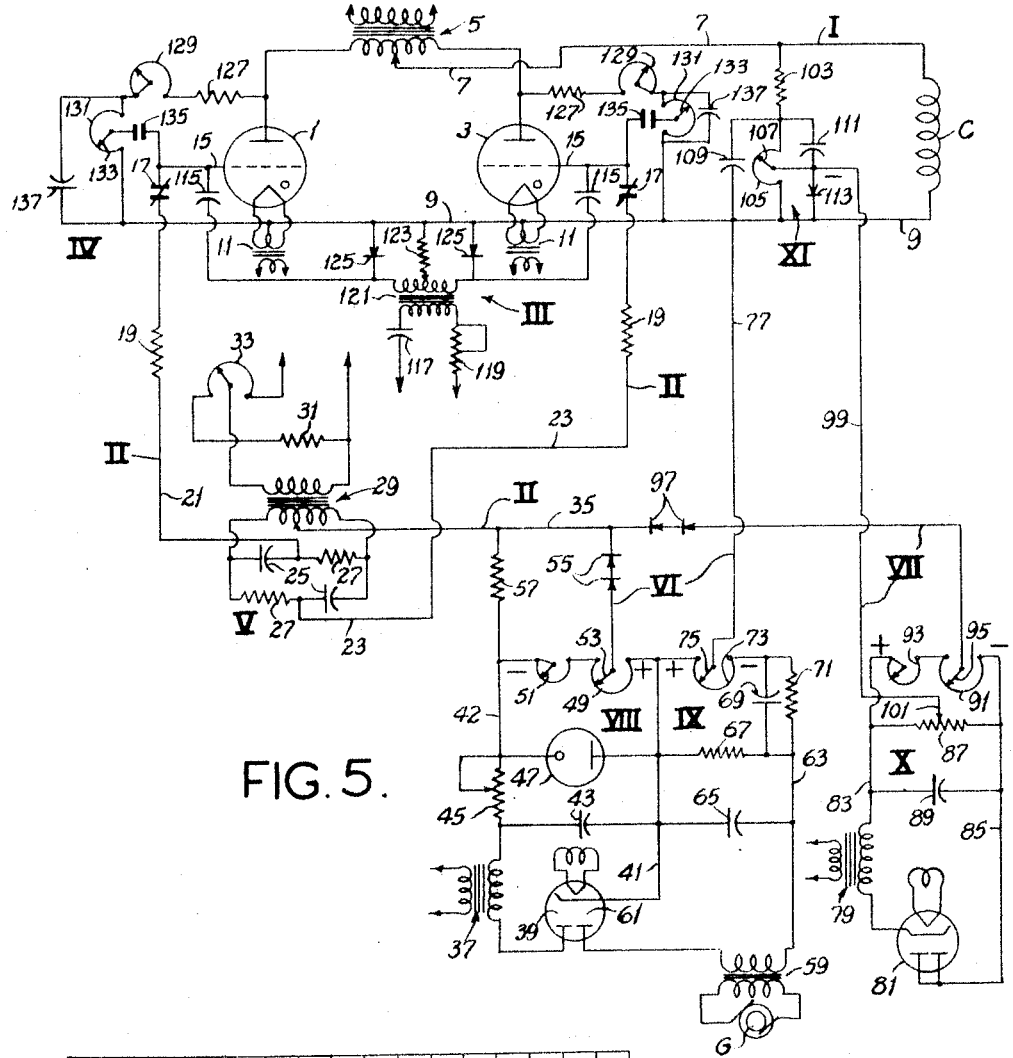
Fig. 5 is a completely detailed circuit diagram.

The power tubes are controlled by certain grid circuits, connections for only one of the power tubes being shown in Fig. 1 so as to simplify the view. The complete circuit is shown in Fig. 5. Briefly, there is a regulating grid circuit II providing speed-regulating and load-regulating action, an inverter grid circuit III providing for fast de-excitation of the field coil C, and a full-excitation grid circuit IV for quickly applying full excitation.

The grid-control circuit II includes an A. C. rider source V providing a sinusoidal voltage in fixed out-of-phase relation with the plate supply 5 for the tubes 1 and 3. The conduction of the power tubes is controlled by imposing a D. C. bias upon the A. C. rider adapted to move the rider up and down, and thereby advance and retard, respectively, the firing of the power tubes 1 and 3. Either one of two circuits VI or VII may be employed to supply this D. C. bias. The circuit VI is a speed-regulating circuit including speed-setting means VIII providing an adjustable reference D. C. voltage, and in series therewith speed-responsive means IX providing a D. C. voltage responsive to the speed of the machine. The circuit VII is a load-control circuit, and includes load-setting means X providing an adjustable reference D. C. voltage and feed-back means XI connected in the power circuit I to provide a D. C. voltage responsive to the energization of the field coil C.

The inverter grid circuit III supplies a firing signal which is so phased with respect to the A. C. plate supply as to invert the D. C. inductive energy of the field coil C but otherwise has nominal effect upon the conduction of the power tubes 1 and 3. The particulars of this circuit will be described later.

The full-excitation grid circuit IV provides a fixed-phase grid signal which fires the tubes under conditions affording full conductivity, and thereby full excitation of the field coil C. In the case of the dynamometer, full excitation may be desired in the case of emergencies to stop the machine as quickly as possible.

Figure 3:
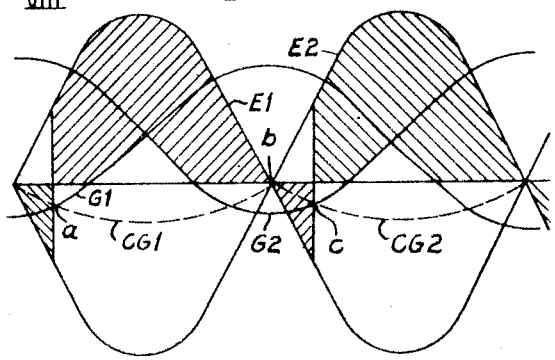
Fig. 3 is a voltage-wave diagram illustrating the operation of grid-controlled gaseous-discharge tubes feeding into an inductive load.

In order to facilitate an understanding of this invention, some of the general aspects of operations of gaseous-discharge devices are considered. Referring to Fig. 3, there is shown an idealized wave diagram for the voltage and current relations existing in a parallel type gaseous-discharge device system supplying a highly inductive load. As indicated, the tube 1 fires when its A. C. grid signal G1 intersects the associated critical grid voltage curve CG1 at $a$. This tube continues to conduct, even after its anode voltage E1 passes through the zero axis at $b$, until the other tube 3 is fired by signal G2 at $c$. The continuation of current flow is the result of the inductive energy in the load. The hatching above the zero axis represents the conduction of power supplied from the A. C. power supply, whereas the hatching below the zero axis represents conduction resulting from the inductive energy of the load.

The points of intersection $a$ and $c$ of the signals G1 and G2 with the critical grid voltage curves CG1 and CG2, respectively, may be advanced or retarded relative to the voltages E1 and E2, by varying a D. C. bias upon which the A. C. components of signals G1 and G2 ride. For example, as the D. C. bias for G1 is increased or driven negative, the firing point or intersection $a$ is retarded relative to the anode voltage. One further point to be noted in connection with Fig. 3 is that as the firing point is retarded, the conduction above the zero axis becomes less and the conduction below the zero axis becomes relatively larger. Consequently, the net power supplied to the load up to a limit decreases rapidly.

In Fig. 3 the firing angle might be said to be approximately 45°.

Figure 4:
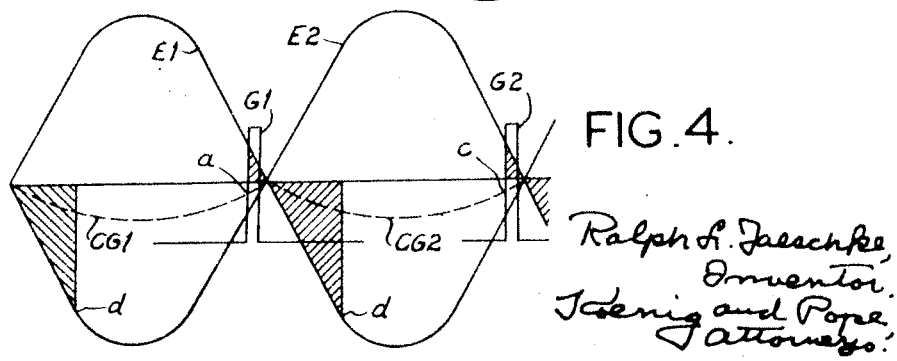
Fig. 4 is a voltage-wave diagram illustrating the inverter operation of the grid-controlled gaseous-discharge tubes.

Fig. 4 is a wave diagram similar to that of Fig. 3, illustrating conditions for inverter action. As shown, peaked grid signals G1 and G2 are employed and these grid signals have a firing angle of approximately 170° (see $a$ and $c$). Under these circumstances, the tubes 1 and 3 are fired when their anode voltages are positive; however, the hatching below the zero axis is considerably greater in area than that above the zero axis. Hence, the net power is minus, or, stated in other words, the D. C. energy of the inductive load is inverted or changed to A. C. energy and pumped back into the power supply lines.

Because of the inductive nature of the loads, the peaked firing signals having a firing angle of 170° ordinarily have little if any effect upon conduction of the tubes, and for that reason this peaked signal may be permanently applied to the grids without interfering with the excitation of the load except when the load is discharging its inductive energy upon reduction in the field excitation. Once a tube fires, it will be understood that it continues to conduct until the plate voltage is reduced to zero. In this instance, the plate voltage for a given tube is reduced to zero by the opposition of the A. C. plate voltage from 5 opposing the voltage inductively developed by the load (as at $d$).

Referring now to the detailed showing of Fig. 5, the power circuit I is as described for Fig. 2, but with the cathode connection 9 being made to tubes 1 and 3 through center-tapped filament transformers 11. Except where described otherwise, the transformers herein are supplied with conventional 60 cycle A. C. power. Also, like reference characters are employed to designate duplicated components in the respective grid circuits for the two tubes 1 and 3, the grid circuits for one tube being identical to those for the other tube, except that the A. C. signals are 180° out of phase to correspond with the same phase difference in plate voltages.

The regulating grid circuits II are connected to control grids 15 through normally-closed relay switches 17 and grid current-limiting resistors 19. A connection 21 is made from tube 1 to the A. C. rider source V with a similar connection 23 being made from the other tube 3. These connections 21 and 23 are made to a pair of parallel connected phase-shifting networks, each of which includes a capacitor 25 and a resistor 27. The phase-shifting networks are supplied from a transformer 29, which in turn is connected to an A. C. supply, as for example, one of the filament transformers 11, through a voltage adjusting network of a resistor 31 and a voltage divider 33. From the rider source V, the grid circuit II is continued to the speed-control circuit VI and the load-control circuit VII, by a connection 35 which is center tapped to the secondary of the transformer 29.

The speed-control circuit VI is constituted by the speed-setting reference means VIII and the speed-responsive means IX. The former is a D. C. voltage supply circuit comprising a transformer 37 and one section 39 of a twin-diode tube, the positive and negative output connections being 41 and 42, respectively. Filtering and regulation is obtained from a capacitor 43, an adjustable resistor 45 and a voltage-regulating tube 47. The output appears across a voltage divider 49 and a vernier adjustment resistor 51;

and an adjustable portion thereof is fed into the circuit VII by a connection from an adjusting arm 53 on the voltage divider 49 through rectifying valves 55 to the conductor 35. A stabilizing resistor 57 is also connected to the conductor 35 from the negative output lead 42.

The speed-responsive means IX comprises the A. C. generator G, a transformer 59 and another section 61 of the aforementioned twin-diode. A D. C. voltage proportional to the speed of the dynamometer is thereby provided across conductors 41 and 63, the latter being negative with respect to the former. Ripple-filtering action is obtained from a capacitor 65 and a shunt resistor 67, and anti-hunt action is obtained from a series-connected anticipator network comprising a capacitor 69 and a resistor 71 connected parallel with one another. The voltage is then fed into the circuit VI from a voltage divider 73 connected in series with the anticipator network and having a common connection at 41 with the voltage divider 49. An adjusting arm 75 on the voltage divider 73 is connected at 77 to the cathode side 9 of the power circuit.

From the above it will be apparent that the speed-responsive signal from IX is in series opposition with the reference signal from VIII, and that the reference signal tends to drive the grid 15 negative.

Connected in parallel with the speed-control circuit VI is the load control circuit VII, which comprises the reference voltage means X and a feed-back circuit XI. The reference voltage means X is an adjustable D. C. voltage supply including a transformer 79 and a twin-diode rectifier tube 81 with positive and negative output leads 83 and 85, respectively. A voltage divider 87 and a capacitor 89 are shunted across the output leads for filtering action, and a second voltage-divider 91 is series connected with an adjustable resistor 93 across the leads 83 and 85 to provide coarse and fine adjustability. The second voltage divider 91 has its adjusting arm 95 connected through rectifying valves 97 to the conductor 35 of the grid circuit II. The grid circuit is then completed by a connection 99 from adjusting arm 101 on the first voltage divider 87 to the feed-back circuit XI.

The feed-back circuit XI comprises a series combination of a resistor 103 and a voltage divider 105 connected across the field coil C between the conductors 7 and 9 of the power circuit I. The reference voltage unit X of the load-control circuit is connected at 99 to an adjusting arm 107 on the voltage divider 105 in order that a portion of the voltage appearing across the field coil is fed into the load-control circuit VII. The arrangement is such that the feed-back circuit XI tends to drive the grids 15 negative and reduce the field excitation at C when the field excitation increases for other reasons. In this sense, the field excitation is regulated. The D. C. signal supplied by the feed-back circuit is ripple filtered by capacitors 109 and 111, and a rectifier valve 113 is connected across the voltage divider 105 to prevent negative pulses from effecting the controlling action.

The rectifying valves 55 and 97 are adapted to isolate the circuits VI and VII from one another, while permitting each to assume control of the dynamometer under proper conditions. The excitation of the field coil C is determined by whichever of the circuits VI and VII supplies the more positive grid signal. For example, the load-control circuit VII may be set to provide a predetermined field excitation and the speed-control circuit VI may be set to increase the field excitation should there be a tendency for the speed of the dynamometer to increase above a predetermined value. The valves 55 and 97 are arranged to prevent the voltage developed by one of the circuits VI and VII from being by-passed by the other circuit.

Returning to the other grid circuits, the inverter circuit III operates in conjunction with the circuit II. As such, it is coupled directly to the control grids 15 through small coupling capacitors 115. For example, they may have a capacitance of the order of 0.005 microfarad. These capacitors are adapted to pass the sharply rising wave front of a peaked signal but to block sinusoidal 60 cycle A. C. signals from the rider source V. A phase-shifting circuit including a capacitor 117 and an adjustable resistor 119 is connected to the primary side of a saturable-core peaking transformer 121. Such transformers are known in the art, and they supply across the secondary a sharp peaked signal on alternate half-cycles of the voltage across the primary. These peaks have steep wave fronts which readily pass through the coupling capacitors 115. Return connections from the tubes 1 and 3 are made through the cathode side 9 of the power circuit and through a small resistor 123 which is center tapped to the secondary of the peaking transformer. This resistor may have a resistance of the order of 5000 ohms.

In order to prevent the negative peaks of the peaking transformer 121 from interfering with the operation of the sensitive gas-filled power tubes 1 and 3, rectifying valves 125 are connected between the opposite ends of the transformer 121 and the cathode connection 9 to pass current to the former.

By adjustment of the phase-shifting network of 117 and 119, the peaked signals from the circuit III are made to fire the tubes 1 and 3 at firing angles of approximately 170°. Normally, such a retarded firing signal has an insignificant effect upon conduction of the power tubes and the peaked signal is therefore effective only when the field coil presents a large inverse voltage. Under the latter condition, the power tubes operate as inverters. Inverter operation is shown diagrammatically in Fig. 4 as explained heretofore.

The full-excitation grid circuits IV each comprises a resistor 127, an adjustable resistor 129 and a voltage divider 131 forming a series combination across the power tubes 1 and 3. Adjusting arms 133 of the voltage dividers 131 are connected to the control grid 15 through normally-open relay switches 135. The latter are operated in conjunction with the relay switches 17 so that the grid circuit II may be disconnected and full excitation applied by grid circuit IV upon actuation of the relay. Further details of the relay will be obvious and are not shown. A capacitor 137 is connected across the voltage divider 131 with the result that the voltage appearing between 133 and 9 is adapted to produce high conduction of the power tubes.

Operation is as follows:

If it is desired to impose a substantially constant load upon the engine E, the load-control circuit is employed. The control elements 87, 91 and 93 are adjusted so that the voltage from the reference source X when opposed by the voltage from the feed-back source XI is sufficient to produce the desired field excitation of the dynamometer. The firing signal supplied through the grid circuit II controls the conduction of the power tubes 1 and 3 and thereby the field excitation. Should the field excitation tend to increase for some reason, the component of voltage from the feed-back source XI increases and tends to drive the net grid voltage more negative. Conduction of the tubes 1 and 3 is then decreased to correct for the undesired increase in field excitation. The load applied by the dynamometer is thereby regulated, it being understood that the load at a given speed is a function of the field excitation.

An alternative method of control is in response to speed. In this instance the load control circuit is rendered ineffective by adjustment at X, and the speed-regulating circuit VI is employed. A speed-setting adjustment is made at source VIII, the voltage divider 49 and the adjustable resistor 51 being adjusted to produce a desired reference voltage which in opposition to the speed-responsive voltage of the source IX provides a particular field excitation. The engine E then runs at the particular speed pre-set by the source VIII. Should there be a tendency to change speed, the change is detected by the means IX and the grid signal of the power tubes is corrected in such manner as to counteract the speed change. On speed increases, the field excitation is increased and vice versa.

It will be understood that circuits VI and VII may be pre-set for automatic control by whichever circuit tends to provide the larger field excitation. In other words, the load-control circuit may be employed to set a minimum load and the speed-control circuit may then be employed to prevent increases in speed above a predetermined value.

Figure 6:
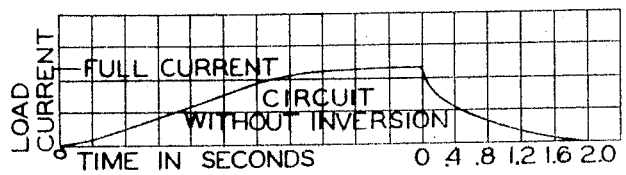
Fig. 6 is a plot of load current as a function of time upon deenergization of a field coil without inversion.
Figure 7:
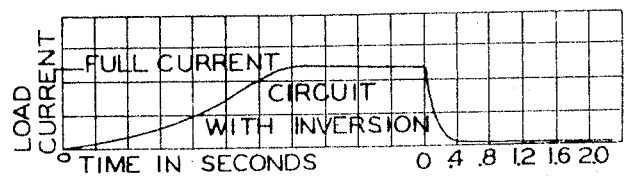
Fig. 7 is a plot similar to Fig. 6 illustrating the relatively fast deenergization of a field coil attained with the inversion action of this invention.

The inverter operation becomes effective when the circuits VI and VII dictate a sudden reduction in the field excitation, as upon manual adjustment of sources VIII and X. When the firing signal supplied by the grid circuit II is removed, the firing signal of the grid circuit III becomes effective and if the field coil then has a large inverse voltage, inversion occurs. The effect of inversion is comparatively illustrated in Figs. 6 and 7, wherein the load current is plotted as a function of time. As shown, the fall-off in field excitation is considerably more rapid with inversion as compared to that without inversion.

If for some reason, it should become necessary to stop or quickly slow the engine E, then the relay switches 17 and 135 are actuated to transfer control from circuit II to circuit IV. The latter produces a substantially full excitation of the field coil C and a high load is imposed upon the engine.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a control system for an inductive load, a pair of grid-controlled gaseous-discharge power tubes connected to form a parallel rectifying circuit for exciting the inductive load, the power tubes having an A. C. plate supply, cathodes, and grid circuits normally controlling conduction of the power tubes, an inverter grid circuit for the power tubes comprising a peaking transformer of the saturable core type, the peaking transformer having a secondary connected through coupling capacitors to the control grids of the respective power tubes, and an A. C. voltage source connected to the primary of the peaking transformer adapted to provide across the secondary a firing signal that is relatively retarded with respect to the plate supply of the power tubes, said coupling capacitors being adapted to pass the peaked firing signal of the inverter grid circuit and block the firing signals of said grid circuits normally controlling conduction of the power tubes.

2. Control means as set forth in claim 1 wherein the coupling capacitors have a capacitance of the order of 0.005 microfarad.

3. Control means as set forth in claim 1 wherein the inverter grid circuit further includes a resistor center-tapped to the secondary of the peaking transformer and connected to the cathode side of the power circuit.

4. Control means as set forth in claim 3 wherein the inverter grid circuit further includes rectifying valves connected between the secondary of the peaking transformer and the cathode side of the power circuit.

5. Control means as set forth in claim 3 wherein said resistor has a resistance of the order of 5,000 ohms.

6. In a control circuit for varying the excitation of an inductive load, a pair of gaseous-discharge power tubes each having a control grid, a parallel type rectifying power circuit including said power tubes and an A. C. power supply, said power circuit being connected to supply the inductive load, a first grid circuit for each power tube connected to the respective control grid thereof and comprising A. C. voltage means providing a sinusoidal firing signal of variable phase with respect to the A. C. power supply for the tubes, and a second grid circuit for each power tube, the second grid circuit for each power tube being connected to the respective control grid thereof through coupling capacitor means and comprising voltage means providing a sharply peaked periodic firing signal that is adapted to pass through the coupling capacitor and that is comparatively retarded in phase with respect to the periodic firing signal supplied by each of the first grid circuits, said coupling capacitor means isolating said first and second grid circuits.

7. In a control circuit for an electric machine having a field coil, a pair of gaseous-discharge power tubes each having a control grid, a parallel type rectifying power circuit comprising an A. C. power supply and said power tubes, said power circuit being connected to excite the field coil of the electric machine, a first grid circuit for each power tube connected to the respective control grid and comprising means providing a sinusoidal firing signal of variable phase with respect to the A. C. power supply, a second grid circuit for each power tube, the second grid circuit for each power tube being connected to the respective control grid through a coupling capacitor and comprising voltage means providing a sharply peaked periodic firing signal that is adapted to pass through the respective coupling capacitor and that is relatively retarded in phase with respect to the firing signal supplied by the first grid circuits, said coupling capacitors isolating said first and second grid circuits.

8. In a control circuit for varying the excitation of an inductive load, a pair of gaseous-discharge tubes, each having a cathode, an anode and a control grid, the cathodes being connected in common with one another, a center-tapped transformer connecting the anodes and supplied from an A. C. power supply, the inductive load being connected between the cathodes and the center-tap of the transformer secondary, there being a first grid circuit supplying a first grid signal for each tube and a second grid circuit supplying a second grid signal for each tube, the first and second grid circuits for one tube being connected in common and the first and second grid circuits for the other tube being connected in common, the grid signal supplied by the second grid circuit having a phase relation with respect to the anode voltage for the respective tubes adapted normally substantially to prevent conduction of the tubes in the absence of a sufficient grid signal from the first grid circuit, and capacitor means isolating the respective first and second grid circuits.

9. In a control circuit for an electric machine having a field coil, a pair of gaseous-discharge power tubes each having a cathode, an anode and a control grid, the power tubes being connected in a parallel type rectifying circuit for exciting the field coil, there being first and second grid circuits for each of the tubes connected in common at the respective control grids, an A. C. rider source connected in the first grid circuits and providing a sinusoidal voltage in fixed out-of-phase relation with the anode voltage of the power tubes, a speed-regulating circuit connected in series with the A. C. rider source, the speed-regulating circuit including in series opposition an adjustable reference D. C. voltage source and means providing a D. C. voltage responsive to the speed of the machine, and the second grid circuits comprising means providing a sharply peaked firing signal of fixed relatively retarded phase with respect to the anode voltage of the power tubes, the second grid circuits being connected to the respective control grids of the power tubes through coupling capacitors adapted to pass the grid signals of the second grid circuits and block the grid signals of the first grid circuits.

10. In a control circuit for an electric machine having a field coil, a pair of gaseous-discharge power tubes each having a cathode, an anode and a control grid, the power tubes being connected in a parallel type rectifying circuit for exciting the field coil, there being first and second grid circuits for each of the tubes connected in common at the respective control grids, an A. C. rider source connected in the first grid circuits and providing a sinusoidal voltage in fixed out-of-phase relation with the anode voltage of the power tubes, a load-control circuit connected in series with the A. C. rider source, the load-control circuit including in series opposition a second adjustable reference D. C. voltage source and means providing a D. C. voltage responsive to excitation of the field coil, and the second grid circuits comprising means providing a sharply peaked firing signal of fixed relatively retarded phase with respect to the anode voltage of the power tubes, the second grid circuits being connected to the respective control grids of the power tubes through coupling capacitors adapted to pass the grid signals of the second grid circuits and block the grid signals of the first grid circuits.

11. In a control circuit for an electric machine having a field coil, a pair of gaseous-discharge power tubes each having a cathode, an anode and a control grid, the power tubes being connected in a parallel type rectifying circuit for exciting the field coil, there being first and second grid circuits for each of the tubes connected in common at the respective control grids, an A. C. rider source connected in the first grid circuits and providing a sinusoidal voltage in fixed out-of-phase relation with the anode voltage of the power tubes, a load-control circuit and a speed-regulating circuit connected in parallel with one another and in series with the A. C. rider source, the speed-regulating circuit including in series opposition an adjustable reference D. C. voltage source and means providing a D. C. voltage responsive to the speed of the machine, the load-control circuit including in series opposition a second adjustable reference D. C. voltage source and means providing a D. C. voltage responsive to excitation of the field coil, rectifying valve means isolating the speed-regulating and load-control circuits, and the second grid circuits comprising means providing a sharply peaked firing signal of fixed relatively retarded phase with respect to the anode voltage of the power tubes, the second grid circuits being connected to the respective control grids of the power tubes through coupling capacitors adapted to pass the grid signals of the second grid circuits and block the grid signals of the first grid circuits.

RALPH L. JAESCHKE.

References Cited in the file of this patent
UNITED STATES PATENTS

| Number | Name | Date |
| --- | --- | --- |
| 2,248,929 | Adler | July 15, 1941 |